United States Patent

Van Den Sype et al.

[11] Patent Number: 5,968,457
[45] Date of Patent: Oct. 19, 1999

[54] APPARATUS FOR PRODUCING HEAT TREATMENT ATMOSPHERES

[75] Inventors: Jaak Stefaan Van Den Sype, Scarsdale, N.Y.; Alan Russell Barlow, Ridgefield, Conn.

[73] Assignee: Praxair Technology, Inc., Danbury, Conn.

[21] Appl. No.: 09/010,532

[22] Filed: Jan. 22, 1998

Related U.S. Application Data

[63] Continuation-in-part of application No. 08/832,257, Apr. 3, 1997, Pat. No. 5,785,774, which is a continuation of application No. 08/493,075, Jun. 21, 1995, abandoned, which is a division of application No. 08/254,796, Jun. 6, 1994, Pat. No. 5,441,581.

[51] Int. Cl.⁶ .................................................. C21D 1/613
[52] U.S. Cl. ........................................... 422/177; 266/138
[58] Field of Search .................................. 148/208, 218, 148/633, 634; 422/177; 266/138

[56] References Cited

U.S. PATENT DOCUMENTS

| | | | |
|---|---|---|---|
| 5,057,164 | 10/1991 | Nilsson et al. | 148/16 |
| 5,069,728 | 12/1991 | Rancon et al. | 148/16 |
| 5,160,380 | 11/1992 | Vocke et al. | 148/206 |
| 5,221,369 | 6/1993 | Bowe et al. | 148/208 |
| 5,242,509 | 9/1993 | Rancon et al. | 148/206 |
| 5,254,180 | 10/1993 | Bonner et al. | 148/208 |
| 5,259,893 | 11/1993 | Bonner et al. | 148/208 |
| 5,298,090 | 3/1994 | Garg et al. | 148/208 |
| 5,348,592 | 9/1994 | Garg et al. | 148/208 |
| 5,441,581 | 8/1995 | Van den Sype et al. | 148/634 |
| 5,779,826 | 7/1998 | Nayar et al. | 148/633 |
| 5,785,774 | 7/1998 | Van Den Sype et al. | 148/634 |

FOREIGN PATENT DOCUMENTS

| | | |
|---|---|---|
| 3405993 | 9/1993 | Australia . |
| WO 9321350 | 10/1993 | WIPO . |

*Primary Examiner*—Scott Kastler
*Attorney, Agent, or Firm*—Robert J. Follett

[57] ABSTRACT

An endogenerator is provided in which CO and $H_2$ are generated as primary products of hydrocarbon oxidation. The reactor is a compact reactor and operates autothermally without auxiliary heating means.

14 Claims, 9 Drawing Sheets

APPARATUS FOR PRODUCING HEAT TREATMENT ATMOSPHERES

This is a Continuation-in-Part of prior U.S. application Ser. No. 08/832,257 Filing Date: Apr. 3, 1997 now U.S. Pat. No. 5,785,774, and which in turn is a continuation of application Ser. No. 08/493,075 Filing Date Jun. 21, 1995 abandoned and which in turn is a division of application Ser. No. 08/254,796 Filing Date Jun. 6, 1994, now U.S. Pat. No. 5,441,581.

FIELD OF THE INVENTION

The present invention relates to process and apparatus for producing heat treatment atmospheres, and more particularly to process and apparatus for generating atmospheres for heat treating metals, alloys and, metal and ceramic powders.

BACKGROUND OF THE INVENTION

Heat treatment of metals in a furnace requires an inert atmosphere, typically nitrogen. Reducing gases, such as carbon monoxide and hydrogen are added to the nitrogen to provide a buffer against oxygen leakage into the furnace.

The atmosphere compositions required to carry out the heat treating of ferrous and non-ferrous metals and alloys, the brazing of metals and the sintering of metal and ceramic powders are well known in the art.

Although in principle nitrogen is inert with respect to most metals and alloys at heat treating temperatures, in practice, reducing elements such as carbon monoxide and hydrogen (CO and $H_2$) must often be added to the atmosphere composition in order to provide a buffer against inleak of oxygen into the furnace.

The oxygen that leaks into the furnace rapidly reacts with the CO and $H_2$ present to form carbon dioxide and water ($CO_2$ and $H_2O$) and as long as the $CO/CO2$ and $H2/H2O$ ratios stay within desired limits the various heat treating processes can be carried out successfully. The actual $CO/CO_2$ and $H_2/H_2O$ ratios to be established will greatly depend on the particular process involved such as decarburization-free annealing, bright annealing, decarburization annealing and controlled oxide annealing of steels and these are well known in the art. For instance, for bright annealing of steels FIG. 1 shows an oxidation diagram for iron in $CO/CO_2$ and $H_2/H_2O$ mixtures. At 800° C. atmospheres with $CO/CO_2>1.4$ and $H_2/H_2O>1.8$ will not oxidize steels (point B); in practice an atmosphere with $CO/CO_2=5$ and $H_2/H_2O=6$ (point A in FIG. 1) can advantageously be used since it will have an adequate buffer against $O_2$ inleaks.

The known methods of preparing buffered atmospheres of this type fall in two main categories. The first category is generated atmospheres from endogenerators, exogenerators, ammonia dissociators. These atmospheres are inexpensive but they involve bulky equipment, are maintenance intensive and the atmospheres often lack consistency. The second category is atmospheres prepared from cryogenic nitrogen with the admixtures of hydrogen or methanol. These atmospheres are of high quality and very controllable but are also very expensive.

Several commercially practiced or proposed techniques to provide heat treating atmospheres for above-mentioned applications are known. One technique uses exothermic generators wherein atmosphere is produced in a refractory lined or a direct water-cooled combustion chamber with one or two burners to which a mixture of natural gas and air is delivered from controlled ratio pumping equipment. The generator is equipped with a cooler through which the products of combustion are discharged after removing a portion of the water produced in the reaction. There are two types of exothermic generators commonly used for ferrous annealing, the rich ratio exothermic generators in which the air to fuel ratio is typically about 6; the combustion atmosphere after cooling and removing most of the water will typically consist of 5% $CO_2$, 11% CO, 14% $H_2$ and 69% $N_2$. Although the gas generated atmosphere has a low $CO/CO_2$ ratio and is decarburizing, the atmosphere is suitable for oxide-free annealing of ferrous materials.

The other type is the purified exothermic generators in which the combustion gases are compressed and the $CO_2$ and $H_2O$ are removed by pressure-swing adsorption on molecular sieve beds. Atmosphere is suitable for decarb-free and oxide-free annealing of ferrous materials.

Another known technique uses endothermic generators diluted with nitrogen or exogas. In endothermic generators, the air to natural gas ratio is typically close to 25% of perfect combustion. Reaction takes place over a catalyst bed (usually Ni on Alumina brick) and external heat must be supplied to maintain the reaction. Gas composition from an endogenerator contains approximately 20% $H_2$, 40% CO, balance $N_2$. For annealing applications this gas is diluted in the furnace with $N_2$ gas. The $N_2$ can be from a cryogenic supply or impure $N_2$ from membrane or PSA. Alternatively, the endogas can be diluted with exogas from an exogenerator.

Still another technique employs nitrogen/methanol systems wherein methanol is introduced directly into the furnace and at the furnace temperature dissociates into $H_2$ and CO. For each gallon of methanol approximately 25 CF of CO and 50 CF of $H_2$ are produced. $N_2$ is also injected to obtain he desired atmosphere for annealing. The $N_2$ can be from cryogenic supply or impure $N_2$, from membrane or PSA.

A further known technique uses internally-mounted endothermic generators wherein the endothermic generator is mounted internally in the furnace thereby saving energy and eliminating the floor space requirement of an external generator. The internal generator is supplied with its own electrical heater and a precious metal catalyst is used for higher efficiency and lower space requirement. For annealing applications, dilution of the endogas with $N_2$ can be used. The $N_2$ can be from a cryogenic supply or impure $N_2$ from membrane or PSA.

A still further technique is one in which endothermic conversion of impure nitrogen is used. In this process an endogenerator type reactor is used to convert the $O_2$ present in nitrogen generated by membrane to $H_2$ and CO. Typical membrane purity is low (between 3 and 5%). Resulting atmospheres have between 5 to 8% CO and 10 to 16% $H_2$. Since only a small amount of heat is generated at these low $O_2$ concentrations, it is necessary to preheat the reactants.

Finally, another technique employs the "in-situ" conversion of impure nitrogen. Various methods have been suggested of premixing nitrogen obtained from membranes or PSA with a predetermined quantity of hydrogen and/or hydrocarbon and injecting this mixture into the hot zone of the furnace. The amount of hydrogen and/or hydrocarbon used is several times the amount required for conversion of the oxygen in the impure nitrogen to the complete oxidation products $CO_2$ and $H_2O$. Location and method of injection can be critical.

The aforesaid known techniques all have drawbacks such that they are not totally satisfactory heat treating atmospheres. Exothermic generators are separate pieces of equipment that need to be maintained. Cooling of the combustion gases and subsequent reheating involves thermal inefficiencies. Rich ratio exothermic generators with or without refrigerant dryers are relatively simple to operate and capital costs are modest. However resultant atmospheres are not of high quality and are not suitable for decarb-free annealing. Purified exogenerator atmospheres are of high quality, however capital and operating costs are high, since it involves compressing the combustion gases and there are losses in the use of molecular sieve beds.

Diluted endothermic gas gives a high quality atmosphere; endothermic generators are however more costly to operate than exogenerators and again involve a separate piece of equipment which must be controlled and maintained. Thermal inefficiency due to atmosphere reheating is also a disadvantage.

Nitrogen/Methanol delivers high quality atmosphere with low capital and maintenance costs. However operating costs are high due to the high cost of methanol. Thermal efficiency is also low since the furnace must provide the heat to dissociate the methanol and bring the injected gases to the furnace temperature.

Internally mounted endothermic generators are relatively new in the technology. Their principal advantage is that no separate generator is required. Furnace atmosphere controls are used to control the output of the generator avoiding duplication. The heat of reaction is not lost so thermal efficiency is high. Standard Nickel or precious metal reforming catalyst is used as in stand-alone generators. Since reforming reactions are slow, space velocities are low and this makes the system bulky which is a disadvantage for internally mounted systems. For example, for one commercially available system, the internally mounted generator delivering 800 SCFH of endogas measures 10.5" diameter and is 32" long.

An example of such a generator is described in U.S. Pat. No. 5,160,380 issued Nov. 3, 1992 to Vocke et al. entitled PROCESS FOR IMPROVED PREPARATION OF TREATMENT GAS IN HEAT TREATMENTS.

The endothermic conversion of the oxygen in membrane nitrogen to CO and $H_2$ has all the disadvantages of external endogenerators and substantially more heat must be provided than for the air/natural gas case. Thermal efficiency is low and capital cost is high.

"In-situ" conversion of impure nitrogen without the use of a catalyst. The principal disadvantage of these methods is that the oxygen in the impure nitrogen will initially give rise to the total oxidation products $H_2O$ and $CO_2$. If only $H_2$ is used, sufficient $H_2$ must be supplied to give the desired $H_2/H_2O$ and $CO_2$. The need for an external $H_2$ source makes this approach expensive. If hydrocarbons such as methane or propane are used, the desired $CO/CO_2$ and $H_2/H_2O$ ratios are obtained through reforming of $CO_2$ and $H_2O$ in the furnace by adding sufficient excess hydrocarbon. These reforming reactions are slow at typical heat treating temperatures particularly when using methane. An example of this is shown in FIG. 2. The desired atmosphere can only be obtained if furnace temperatures are high enough and the gas residence time is long enough for sufficient reforming to take place. Gas composition will therefore be dependent on the operation of the furnace.

Other background references relating to the present subject matter are as follows.

U.S. Pat. No. 5,298,090 issued Mar. 29, 1994, to Garg et al. entitled "ATMOSPHERES FOR HEAT TREATING NON-FERROUS METALS AND ALLOYS" discloses a process for producing low-cost atmospheres suitable for annealing, brazing, and sintering non-ferrous metals and alloys from non-cryogenically produced nitrogen containing up to 5% residual oxygen. According to the process, suitable atmospheres are produced by 1) pre-heating the non-cryogenically produced nitrogen stream containing residual oxygen to a desired temperature, 2) mixing it with more than a stoichiometric amount a hydrocarbon gas, 3) passing it through a reactor packed with a platinum group of metal catalyst to reduce the residual oxygen to very low levels and convert it to a mixture of moisture and carbon dioxide, and 4) using the reactor effluent stream for annealing, brazing, and sintering non-ferrous metals and alloys in a furnace. The key features of the disclosed process include 1) pre-heating the non-cryogenically produced nitrogen containing residual oxygen to a certain minimum temperature, 2) adding more than a stoichiometric amount of a hydrocarbon gas to the pre-heated nitrogen stream, and 3) using a platinum group of metal catalyst to initiate and sustain the reaction between oxygen and the hydrocarbon gas.

U.S. Pat. No. 5,259,893, issued Nov. 9, 1993 to Bonner et al., entitled "IN-SITU GENERATION OF HEAT TREATING ATMOSPHERES USING A MIXTURE OF NON-CRYOGENICALLY PRODUCED NITROGEN AND A HYDROCARBON GAS", discloses a process for generating in-situ low-cost atmospheres suitable of annealing and heat treating ferrous and non-ferrous metals and alloys, brazing metals, sealing glass to metals, and sintering metal and ceramic powders in a continuous furnace from non-cryogenically produced nitrogen containing up to 5% residual oxygen. The disclosed process involves mixing nitrogen gas containing residual oxygen with a predetermined amount of a hydrocarbon gas, feeding the gaseous mixture through a nonconventional device into the hot zone of a continuous heat treating furnace, converting residual oxygen to an acceptable form such as a mixture of moisture and carbon dioxide, a mixture of moisture, hydrogen, carbon monoxide, and carbon dioxide, or a mixture of carbon monoxide, moisture, and hydrogen, and using the resultant gaseous mixture for annealing and heat treating metals and alloys, brazing metals, sintering metal and ceramic powders, and sealing glass to metals.

U.S. Pat. No. 5,254,180 issued Oct. 19, 1993 to Bonner et al., entitled "ANNEALING OF CARBON STEELS IN A PRE-HEATED MIXED AMBIENTS OF NITROGEN, OXYGEN, MOISTURE AND REDUCING GAS", discloses an improved process for producing high moisture containing nitrogen-based atmospheres suitable for oxide and decarburize annealing of carbon steels from non cryogenically generated nitrogen. These nitrogen-based atmospheres are produced by mixing non-cryogenically generated nitrogen containing less than 5.0 vol. % residual oxygen with a specified amount of hydrogen, humidifying the gaseous feed mixture, feeding the gaseous mixture into the heating zone of a furnace through a diffuser, and converting in-situ the residual oxygen present in it to moisture. According to the present invention, the total amount of hydrogen required for producing suitable atmospheres can be minimized by simultaneously humidifying the feed gas and controlling the residual oxygen level in it. The key features of the present invention include a) humidifying the feed gas prior to introducing it into the heating zone of a furnace operated above about 600° C., b) selecting the level of residual oxygen in the feed gas in such a way that it minimizes hydrogen consumption, and c) using enough amount of hydrogen to convert completely the residual oxygen present in the feed gas to moisture and to maintain $pH_2/pH_2O$ ratio in the heating zone of the furnace below about 2 for oxide annealing and at least 2 for decarburize annealing carbon steels.

U.S. Pat. No. 5,242,509, issued Sep. 7, 1993 to Rancon et al. entitled "PROCESS OF THE PRODUCTION OF AN ATMOSPHERE FOR THE THERMAL TREATMENT OF METALS AND THERMAL TREATMENT APPARATUS", describes a process wherein the thermal treatment atmosphere is obtained by catalytic reaction of an impure mixture of nitrogen, advantageously obtained by permeation or adsorption, and hydrocarbon, the catalytic reaction being carried out at a temperature between 400° and 900° C., typically between 500° and 800° C., with a noble metal base catalyst, typically platinum or palladium on alumina support. The reaction may be carried out in a reactor placed inside or outside the furnace.

U.S. Pat. No. 5,221,369 issued Jun. 22, 1993 to Bowe et al., entitled "IN-SITU GENERATION OF HEAT TREATING ATMOSPHERES USING NON-CRYOGENICALLY PRODUCED NITROGEN", discloses a process for generating in-situ low-cost atmospheres suitable for annealing and heat treating ferrous and non-ferrous metals and alloys, brazing metals and ceramics, sealing glass to metals, and sintering metal and ceramic powders in a continuous furnace from non-cryogenically produced nitrogen containing up to 5% residual oxygen. The disclosed process involves mixing nitrogen gas containing residual oxygen with a predetermined amount of a reducing gas such as hydrogen, a hydrocarbon, or a mixture thereof, feeding the gaseous mixture through a non-conventional device into the hot zone of a continuous heat treating furnace, converting residual oxygen to an acceptable form such as moisture, a mixture of moisture and carbon dioxide, or a mixture of moisture, hydrogen, carbon monoxide and carbon dioxide, and using the resultant gaseous mixture for annealing and heat treating metals and alloys, brazing metals and ceramics, sintering metal and ceramic powders, and sealing glass to metals.

U.S. Pat. No. 5,069,728 issued Dec. 3, 1991 to Rancon et al., entitled "PROCESS FOR HEAT TREATING METALS IN A CONTINUOUS OVEN UNDER CONTROLLED ATMOSPHERE", describes the heat treating of metals by continuous longitudinal passage of metallic pieces in an elongated treating zone under controlled atmosphere having a high temperature upstream end where the controlled atmosphere comprises nitrogen and reducing chemical substances, such as hydrogen, possibly carbon monoxide, and a down-stream cooling end under an atmosphere essentially formed by introducing nitrogen. In the high temperature upstream end, the nitrogen which constitutes the atmosphere is supplied by introducing nitrogen with a residual oxygen content not exceeding 5%. The nitrogen introduced in the downstream cooling end is substantially free of oxygen. Application of the process to the annealing of metallic pieces.

U.S. Pat. No. 5,057,164 issued Oct. 15, 1991 to Nilsson et al., entitled "PROCESS FOR THERMAL TREATMENT OF METALS", discloses a process for thermal treatment of metals by passage of metallic pieces into an elongated zone under a controlled atmosphere, having an upstream section at an elevated temperature, where the controlled atmosphere comprises nitrogen and reductive chemicals, particularly hydrogen, possibly carbon monoxide; and a downstream section at a lower temperature under a controlled atmosphere. The invention is characterized by the fact that in the upstream section at an elevated temperature, the atmosphere comprises nitrogen having a residual content of oxygen between 0.5% and 5% produced by separation of air using permeation or adsorption techniques. The reductive chemicals are present at all times in a content at least sufficient to eliminate the oxygen admitted with the nitrogen. The controlled atmosphere in the section downstream from the elongated thermal treatment zone is formed by admission of a gaseous flow taken from the upstream section at an elevated temperature and transferred directly into the downstream section at a lower temperature.

Australian Patent Application 34059/93 dated Sep. 16, 1993 to Frey, entitled "METHOD AND APPARATUS FOR FORMING A HEAT TREATING ATMOSPHERE", describes a method of forming a heat treating atmosphere by removing at least a substantial portion of the oxygen contained within a feed stream of air to produce a nitrogen rich gas and an oxygen enriched waste gas, mixing the nitrogen rich gas and a substituted or unsubstituted hydrocarbon gas to form a first mixture; and reacting the first mixture in the present of a non-noble metal catalyst to form said heat treating atmosphere containing a predominant amount of nitrogen gas and no more than trace amounts of carbon dioxide and water vapor.

PCT Patent WO 93/21350 Gross et al. dated Oct. 28, 1993 and entitled "METHOD OF PRODUCING A PROTECTIVE OR REACTIVE GAS FOR THE HEAT TREATMENT OF METALS" discloses nitrogen produced by non-cryogenic methods, such as those using pressure-change adsorption or membrane installations, cannot owing to its high oxygen content of about 0.1 to 5% V/V, be used for the heat treatment of metals, or can only be used to a limited degree. The invention proposes an endothermic catalytic conversion of the oxygen contained in the nitrogen by means of hydrocarbons to give a protective gas which is suitable for the heat treatment of metals.

SUMMARY OF THE INVENTION

With non-cryogenic methods to produce nitrogen such as membrane or PSA, the possibility exists to make prepared atmospheres for heat treating applications that are much less expensive. Problems however arise from the residual oxygen present in these sources of nitrogen. The present invention provides reliable methods to convert this residual oxygen into reducing species without unduly raising costs.

Heretofore endogenerators were developed mainly for carburizing purposes. In such applications the highest possible carbon potential is desirable. The catalyst bed (usually Ni-alumina brick) is operated at temperatures between 1000° C. and 1200° C.; space velocities are low and external heat must be supplied. An object of the present invention is to provide an endogenerator for heat treatment that uses a noble metal catalyst operating in a lower temperature range (750° C. to 900° C.) and since the heat treating applications to which the present invention applies require leaner atmospheres and lower carbon potentials, the present invention provides a reactor which operates autothermally and in which very high space velocities are achieved. The reactors of the present invention provide inexpensively the reducing elements required to obtain buffered atmospheres in heat treating furnaces and thereby allow the introduction of inexpensive nitrogen produced by membranes or PSA into such furnaces.

Another object of the present invention is to provide a reactor including a catalyst using noble metals including rhodium, platinum, ruthenium, palladium, osmium and iridium and mixtures thereof.

Another object of the present invention is to provide a reactor including a catalyst carrier of alumina; porous ceramic pellets or monoliths made from magnesia, silica, zirconia, titania or mixtures thereof such as cordierite.

Still another object of the present invention is to provide a reactor using hydrocarbons such as methane (natural gas) or propane or other alkanes such as ethane, butane or other alkenes such as ethylene, propylene.

A further object of the present invention is to provide a catalyst and carrier that can be located internal or external to a heat treating furnace.

Still another object of the present invention is to provide a reactor that requires no auxiliary heating means during a heat treatment-process.

BRIEF DESCRIPTION OF THE DRAWINGS

The above set forth and other features of the invention are made more apparent in the ensuing Detailed Description of the Invention when read in conjunction with the attached drawings, wherein.

DESCRIPTION OF THE PREFERRED EMBODIMENTS

Figure 1:
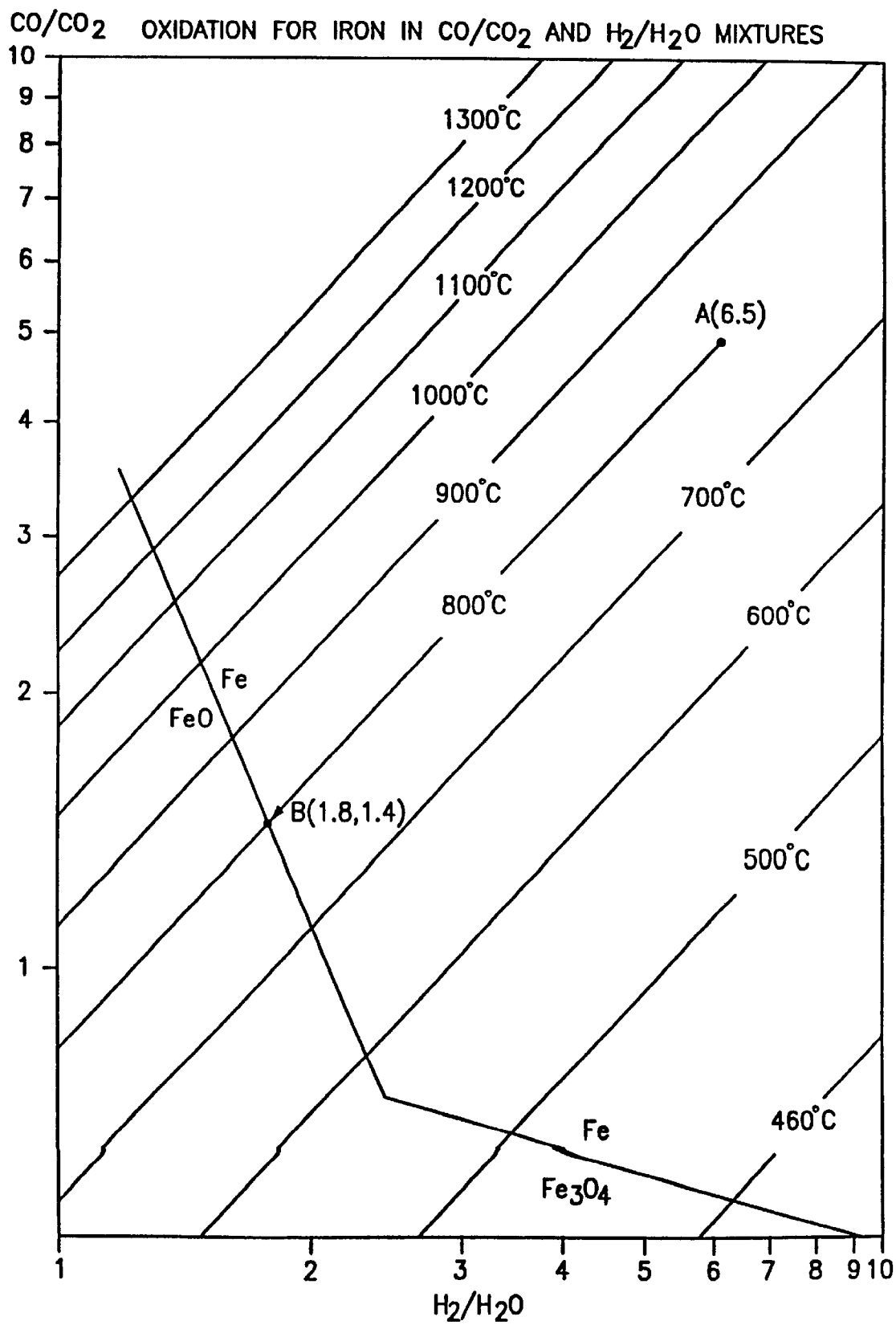
FIG. 1 is a curve illustrating an oxidation diagram for iron as $CO/CO_2$ and $H_2/H_2O$ mixtures.
Figure 2:
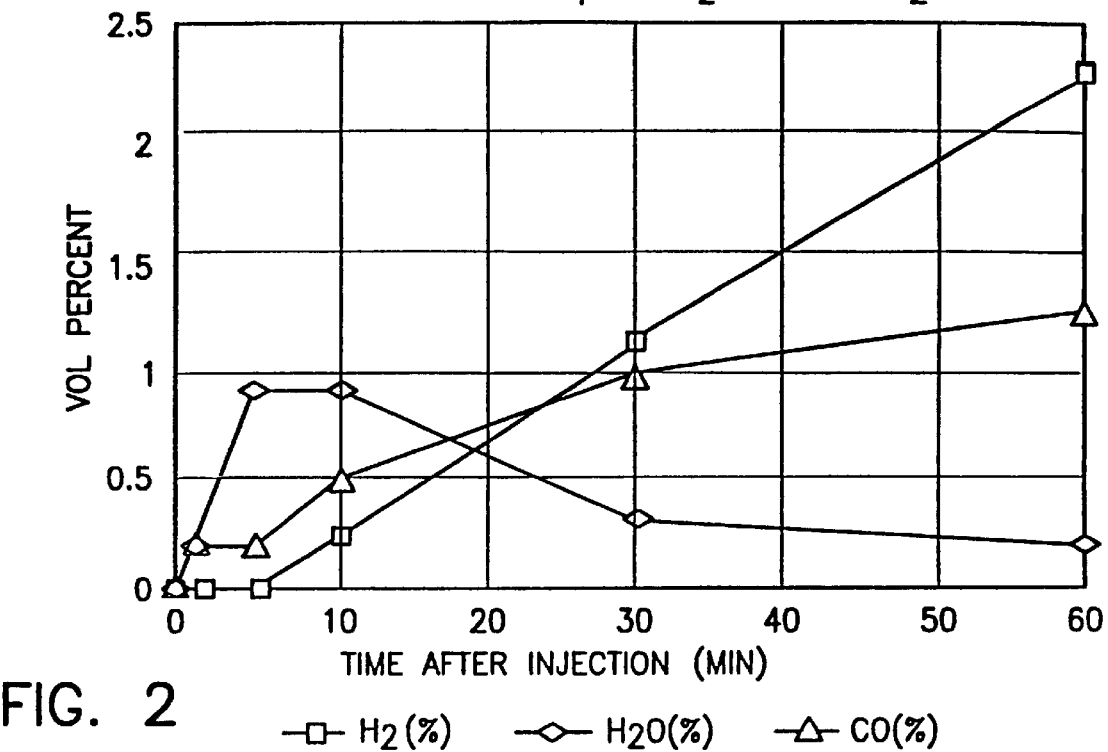
FIG. 2 is a curve illustrating the effect of the direct injection of $CH_4$ in membrane $N_2$ at a temperature of 1380 degrees F.

An endogas generator is provided in which CO and $H_2$ are generated as primary products of hydrocarbon oxidation. Noble metal catalysts such as platinum (Pt) and rhodium (Rh), when sufficiently loaded on a porous ceramic support, for example, an alumina carrier, have CO and $H_2$ selectivities that are high enough to make atmospheres that are suitable for heat treating applications. Thus, the noble metal catalyst can be selected from the platinum group metals: ruthenium, rhodium, palladium, osmium, iridium and platinum. Mixtures of these elements can be used as well.

The preferred catalyst carrier is alumina; however porous ceramic pellets or monoliths made from magnesia, silica, zirconia, titania or mixtures thereof such as cordierite can also be used.

In the reactor of the present invention little or no CO and $H_2$ are produced by the slow and energy-intensive reforming reactions and this allows for a compact reactor which operates autothermally without auxiliary heating means. Reactors according to the invention may operate with high space velocities wherein space velocity is defined as the number of standard cubic feet per hour of output gas per cubic foot of the catalyst carrier.

Preferred hydrocarbons are methane (natural gas) or propane. The process can however also be carried out with other alkanes and alkenes or mixtures thereof when the appropriate oxidant/fuel ratio is used for conversion to CO and $H_2$. Examples of other alkanes: ethane, butane, examples of alkenes: ethylene propylene. Preferred oxidants are nitrogen/oxygen mixtures with from 5% oxygen up to 100% oxygen.

The present invention provides a process and apparatus that generates the required reducing gases CO and H2 for heat treating of metals via the direct oxidation reaction:

$$CH_4 + \tfrac{1}{2}O_2 \rightarrow CO + 2H_2, \Delta H = -8.5 \text{kcal/mol}. \tag{1}$$
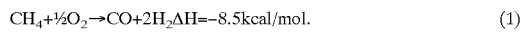

Natural gas and $O_2/N_2$ mixtures ranging from nitrogen containing from 5% up to 100% $O_2$ are introduced over a noble metal catalyst which is held at a temperature of at least 600° C. (for 5% $O_2$) and 300° C. (for 100%$O_2$). These are the minimum light-off temperatures for methane. If propane is used the minimum light-off temperature is about 250° C. (for 21% $O_2$). The catalyst can be situated in a separate reactor or can be conveniently located inside the furnace. The system operates autothermally, that is, no auxiliary heaters for preheating the input gases or heating the catalyst bed are required. There can be heat exchange from the exiting gases or from the furnace's gases to the catalyst or the input gases. For an ex-situ reactor, the input gases can be optionally preheated to between 500° C. and 650° C. using the available heat in the exit gas. Higher $CO/CO_2$ and $H_2/H_2O$ ratios can be obtained using preheat.

Previously known endothermic generators that deliver either low quality (high $CO_2$ content) or, when purified, high capital cost atmospheres are also based on the overall reaction (1), since at high temperature (e.g., 1000° C.) equilibrium dictates that a 2/1 ratio mixture of methane/oxygen will completely convert to a 2/1 ratio $H_2$ CO mixture. However in prior art endogenerators the approach to equilibrium is slowed because of the formation of total oxidation products $CO_2$ and $H_2O$ resulting in excess $CH_4$ which is subsequently (downstream in the reactor) converted to CO and $H_2$ via the reactions:

$$CH_4 + H_2O \rightarrow CO + 3H_2 \ \Delta H = +49.2 \text{kcal/mol}. \tag{2}$$

and $$CH_4 + CO_2 \rightarrow 2CO + 2H_2 \ \Delta H = +62.4 \text{kcal/mol}. \tag{3}$$
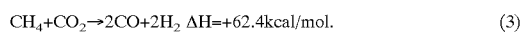

Figure 3:
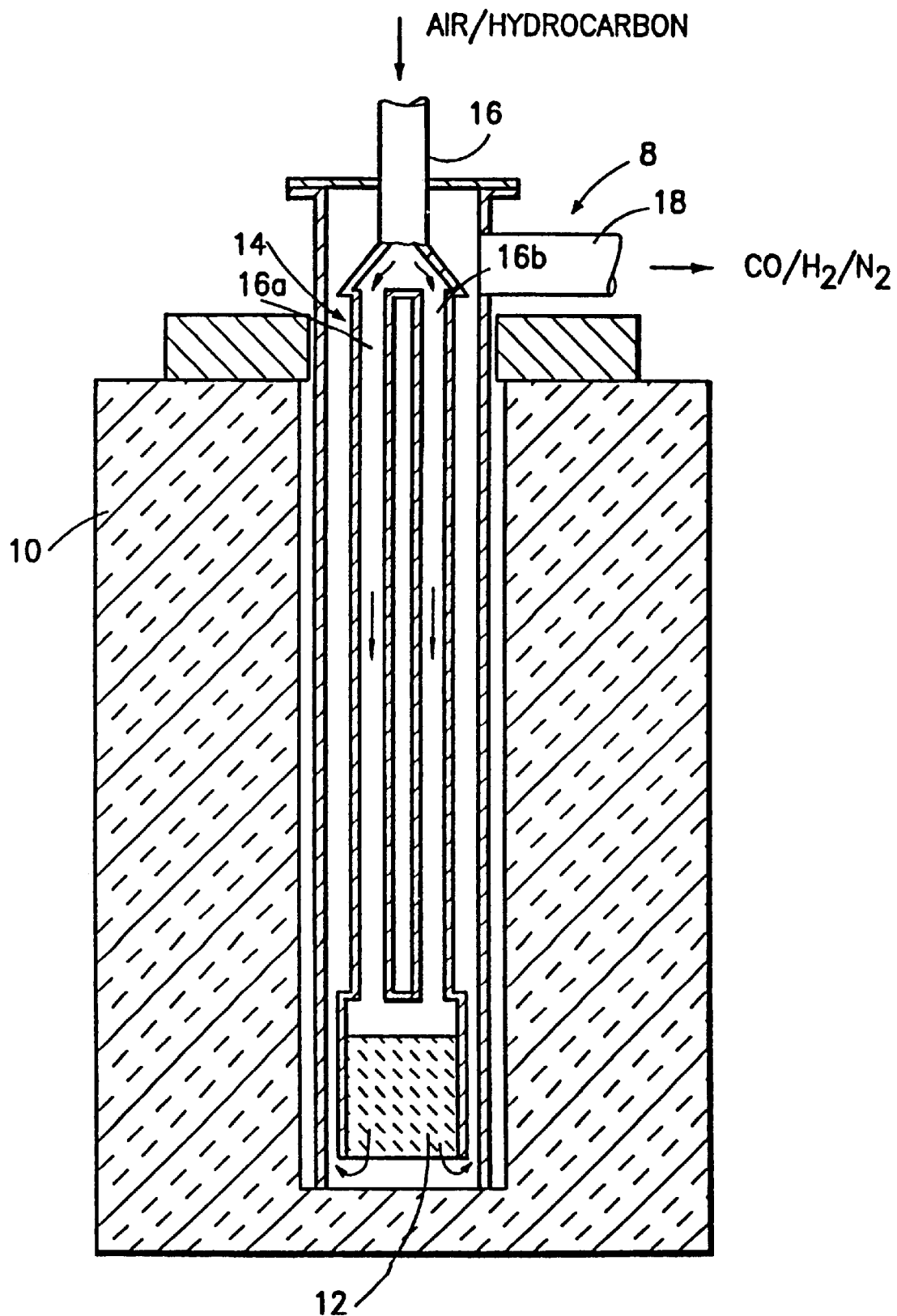
FIG. 3 is a schematic cross-sectional side-view illustration of one embodiment of a reactor including a catalyst and carrier that operates autothermally according to the principles of the present invention.

Several embodiments of the present invention will be described as examples:

Referring to FIG. 3, a schematic cross-section of a reactor structure 8 is shown including a body of insulating material 10 having a recess in which a catalyst and carrier combination 12 is disposed. The catalyst is composed of a noble metal such as platinum, rhodium or the like in a porous ceramic carrier such as an alumina carrier. A gas transport system 14 extends into the recess, and includes a first conduit 16 that changes into separate tubes 16a, 16b located within a second conduit 18. Two tubes 16a and 16b are shown for purposes of explanation, however three or more tubes can be used if desired. Input gases such as air/hydrocarbon are directed into conduit 16, are conducted through tubes 16a and 16b and react with the catalyst in combination 12. As previously discussed, a reaction (1) occurs producing CO and $H_2$ as an output gas for methane as the hydrocarbon.

The output gas that enters conduit 18 is hotter than the input gas in tubes 16a and 16b. The output gas in conduit 18 circulates around the tubes 16a and 16b.

The output gas in conduit 18 may then be introduced into a heat treating furnace for the treatment of metals, alloys or metal and ceramic powders.

It should be noted that as the output gases in conduit 18 circulate past the input gases in conduits 16a and 16b, a heat exchange between the output gas and the input gas takes place, so it is not necessary to provide an auxiliary heating means such as heating coils or a flame to heat the incoming gases during operation as in the prior art. It may be necessary however to initially heat the incoming gases at the beginning of the operation to start the heat exchange process.

Figure 4:
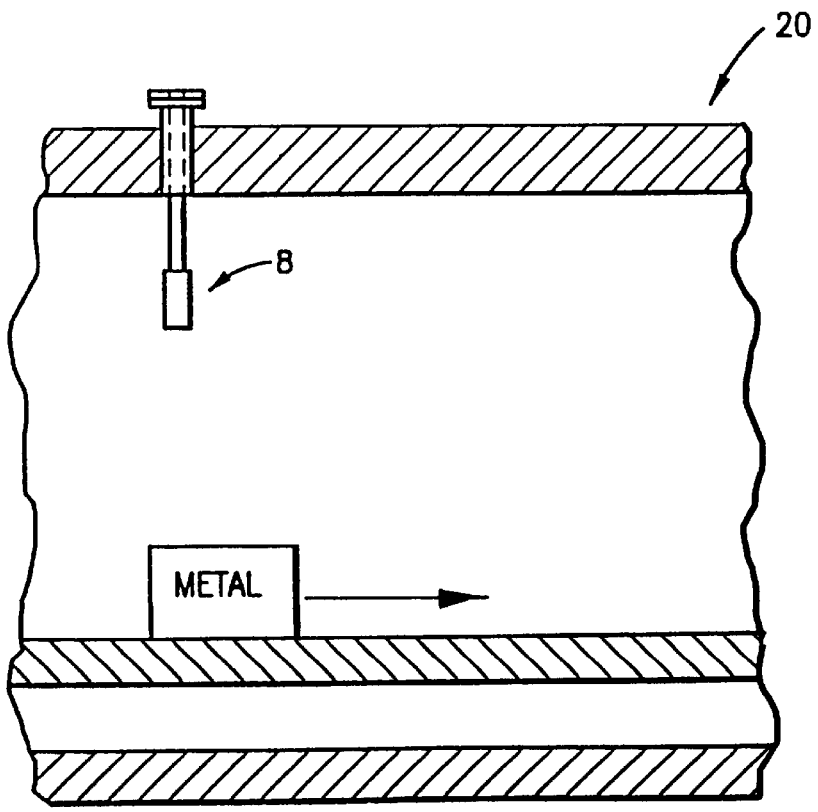
FIG. 4 is a schematic cross-sectional side-view illustration of a heat treating furnace showing a reactor disposed within the furnace according to the principles of the present invention.

Referring to FIG. 4, a schematic cross-section of a typical heat treating furnace 20 is illustrated showing the reactor structure 8 of FIG. 3 located within the furnace. The operation of the reactor structure 8 is as previously described, except that the output gases from the reactor structure are introduced inside the furnace. One advantage of locating the reactor structure 8 within the furnace 20 is that the insulating material 10 may be eliminated from reactor structure 8 so the heat of the furnace can be used in the heat exchange process.

Figure 5:
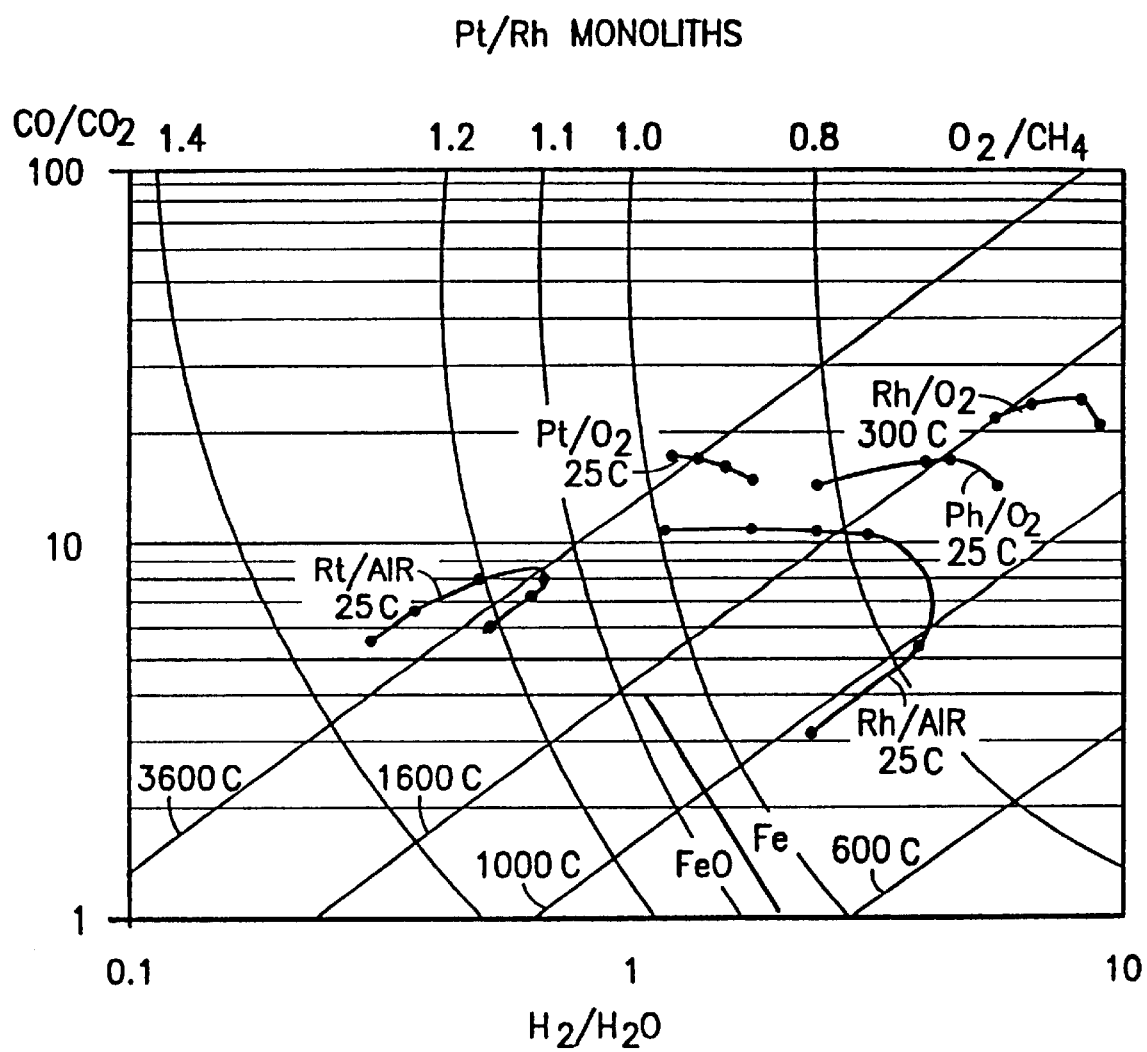
FIG. 5 is a curve illustrating the effect of the reaction of methane mixtures with a platinum or rhodium loaded alumina catalyst.

FIG. 5 illustrates the properties that can be obtained at very high space velocities (1,000,000 standard cubic foot per hour of output gas per cubic foot of catalyst used or higher). No reforming reactions are taking place.

The data illustrated in FIG. 5 was obtained in another embodiment wherein a reticulated alumina foam with about 80 pores per inch was loaded with 10% rhodium by weight. Size of the monolith was ⅝" diameter, ½" length. Catalyst was mounted between 2 cordierite open-channel pieces and heated in a tube furnace. Mixes of methane/air, methane/33% $O_2$ in $N_2$, methane/$O_2$ and propane/air with various $O_2$/hydrocarbon stoichiometries were passed over the catalyst; exit gases were quenched and analyzed for $H_2$, $H_2O$, CO, $CO_2$ and $CH_4$. The results are summarized in FIG. 5. It is seen that for each oxidant used there is an optimum $O_2/CH_4$ ratio in the mix which achieves the highest $CO/CO_2$ and $H_2/H_2O$ ratio. The constant temperature lines indicate the temperatures at which the observed ratios would be in equilibrium. It is clear that these ratios are far from equilibrium since the adiabatic temperatures in the catalyst are in the 600° to 900° C. range depending on the composition and the amount of preheat. If these exit gas mixes are injected into e.g. a steel annealing furnace, the water shift reaction would change the ratios along a constant $O_2/CH_4$ line and reach the equilibrium composition at the furnace temperature. It is seen that optimum mixes for the Rh/air (25° C.), Rh/$O_2$ (25° C.), Rh/$O_2$ (300° C.) and Pt/$O_2$ (25° C.) all result in furnace compositions which are reducing to steel and therefore result in bright product. The Pt/air (25° C.) however would be oxidizing to steel since the $H_2$ selectivity is not high enough in the direct oxidation step. As will be shown in the following examples lowering the space velocity will allow the $H_2O$ reforming reaction to occur and satisfactory atmosphere compositions can be achieved with non-preheated Pt/air mixes at these lower space velocities.

In the previous example it was shown that the methane/air mix on a Pt catalyst with no preheat, the direct oxidation reaction can give adequate $CO/CO_2$ ratios but the $H_2/H_2O$ ratio is less than 1. In the second embodiment it is shown that by lowering space velocities $H_2O$ reforming occurs and satisfactory $H_2/H_2O$ ratios are obtained. Space velocities will still be 5 to 10 times higher than in prior art endogenerators. The effect of preheating the reaction mix will also be shown.

A second embodiment platinum catalyst on alumina carrier with 0.5% Pt by weight loading was used in the form of ⅛"×⅛" cylindrical pellets. Approximately 140 gram of this catalyst was placed in a tube (approx. 1.5" diameter) inside a furnace. An air/methane mix with ratio of about 2.38 was flowed over the catalyst with space velocity of about 16000 standard cubic foot per hour (SCFH) of output gas per cubic foot of catalyst used. Input gas temperature was 24° C. (no preheat); furnace temperature was 760° C. Exit gases from the catalyst bed were quenched and analyzed using a gas chromatograph. $CO/CO_2$ ratio was about 12 and $H_2/H_2O$ ratio was about 11.

In another test an air/methane mix with ratio of about 2.38 was flowed over the catalyst with space velocity of about 16000 standard cubic foot per hour of output gas per cubic foot of catalyst used. Input gas was preheated to 252° C.; furnace temperature was 760° C. The exit gas temperature was 775° C. Exit gases from the catalyst bed were quenched and analyzed using a gas chromatograph. CO/CO2 ratio was about 18 and $H_2/H_2O$ ratio was about 14.

In another test an air/methane mix with ratio of about 2.38 was flowed over the catalyst with space velocity of about 16000 standard cubic foot per hour of output gas per cubic foot of catalyst used. Input gas was preheated to 505° C.; furnace temperature was 760° C. The exit gas temperature was 825° C. Exit gases from the catalyst bed were quenched and analyzed using a gas chromatograph. $CO/CO_2$ ratio was about 24 and $H_2/H_2O$ ratio was about 16.

In another test an air/methane mix with ratio of about 2.38 was flowed over the catalyst with space velocity of about 16000 standard cubic foot per hour of output gas per cubic foot of catalyst used. Input gas was preheated to 654° C.; furnace temperature was 870° C. The exit gas temperature was 794° C. Exit gases from the catalyst bed were quenched and analyzed using a gas chromatograph. $CO/CO_2$ ratio was about 80 and $H_2/H_2O$ ratio was about 41.

From these examples it is clear that high ratios can be obtained with methane/air mixes over Pt catalysts at space velocities of 16000 standard cubic foot per hour of output gas per cubic foot of catalyst used. Preheating the input gases will increase the ratios. From the observed exit gas temperatures it is clear that the input gases can be preheated using standard gas to gas heat exchangers. No external heat input is required.

In the present invention, propane as well as methane can be used as the hydrocarbon gas.

Thus, in one propane embodiment, a platinum catalyst on alumina carrier with 1% Pt by weight loading was used in the form of ⅛" diameter spherical pellets. An air/propane mix with a ratio of about 7.11 was flowed over the catalyst with a space velocity of 100,000 standard cubic foot per hour of output gas per cubic foot of catalyst used. Input gas temperature was 81° C.; furnace temperature was 870° C. Exit gases from the catalyst bed were quenched and analyzed using a gas chromatograph. $CO/CO_2$ ratio was about 31 and $H_2O$ ratio was about 27.

Also, an $O_2\%$ in oxidant <21% (air) can be employed.

Thus, in still another embodiment, a platinum catalyst on alumina carrier with 1% Pt by weight loading was used in the form of ⅛" diameter spherical pellets. The oxidant was a $N_2/O_2$ mixture of 12% $O_2$. An oxidant/methane mix with a ratio of about 16.7 was flowed over the catalyst with a space velocity of 50,000, standard cubic foot per hour of output gas per cubic foot of catalyst used. Input gas was preheated to 335° C.; furnace temperature was 870° C. Exit gases from the catalyst bed were quenched and analyzed using a gas chromatograph. $CO/CO_2$ ratio was about 10 and $H_2/H_2O$ ratio was about 8.

In the third embodiment, a platinum catalyst on alumina carrier with 0.5% Pt by weight loading was used in the form of ⅛"×⅛" cylindrical pellets. Approximately 16 lbs of this catalyst was placed in 2 identical containers, each approximately 5.5" diameter and 30" long, inside an industrial pusher furnace. One injector is detailed in FIG. 4. A total of 935 SCFH of natural gas and 2225 SCFH of air was mixed in a fuel/air mixing machine and flowed over the catalyst beds using a space velocity of about 16000 standard cubic foot per hour of output gas per cubic foot of catalyst used. Furnace temperature was 732° C. About 4700 SCFH of reacted gas was produced from the injectors. $CO/CO_2$ ratio as measured at the injector exit in the furnace was about 8 and H2/H2O ratio was about 16. 6600 SCFH of $N_2$ with about 0.8% oxygen from a membrane unit was also injected. About 150 SCFH of propane was added as an enriching gas. Analysis of furnace composition showed 8% CO, 0.9% $CO_2$, 15% $H_2$ and 0.8% $H_2O$. This atmosphere allowed decarb-free annealing of a variety of low and medium carbon steels.

Figure 6:
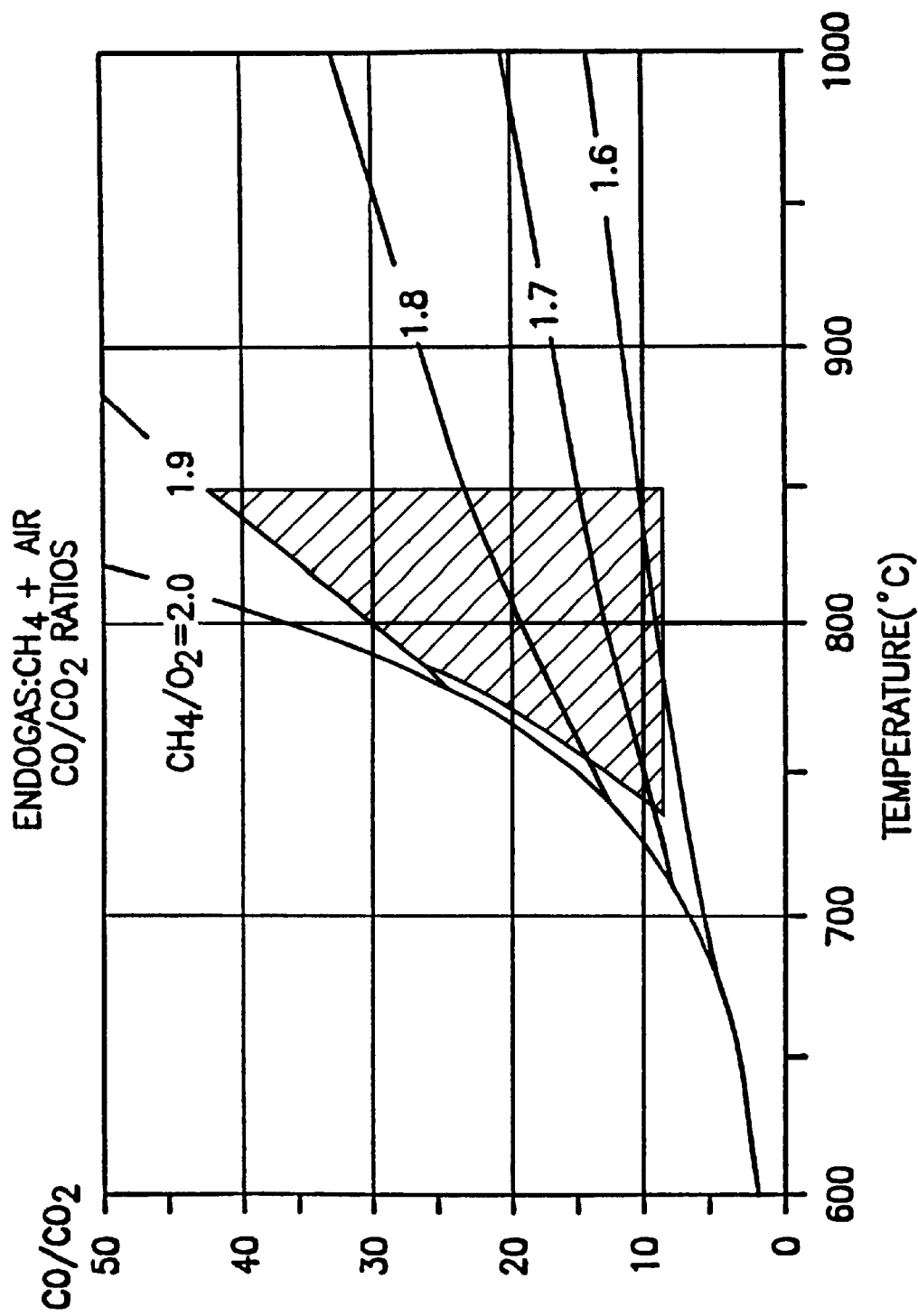
FIGS. 6 and 7 are curves illustrating the operational features of an endothermic reactor according to the principles of the present invention.
Figure 7:
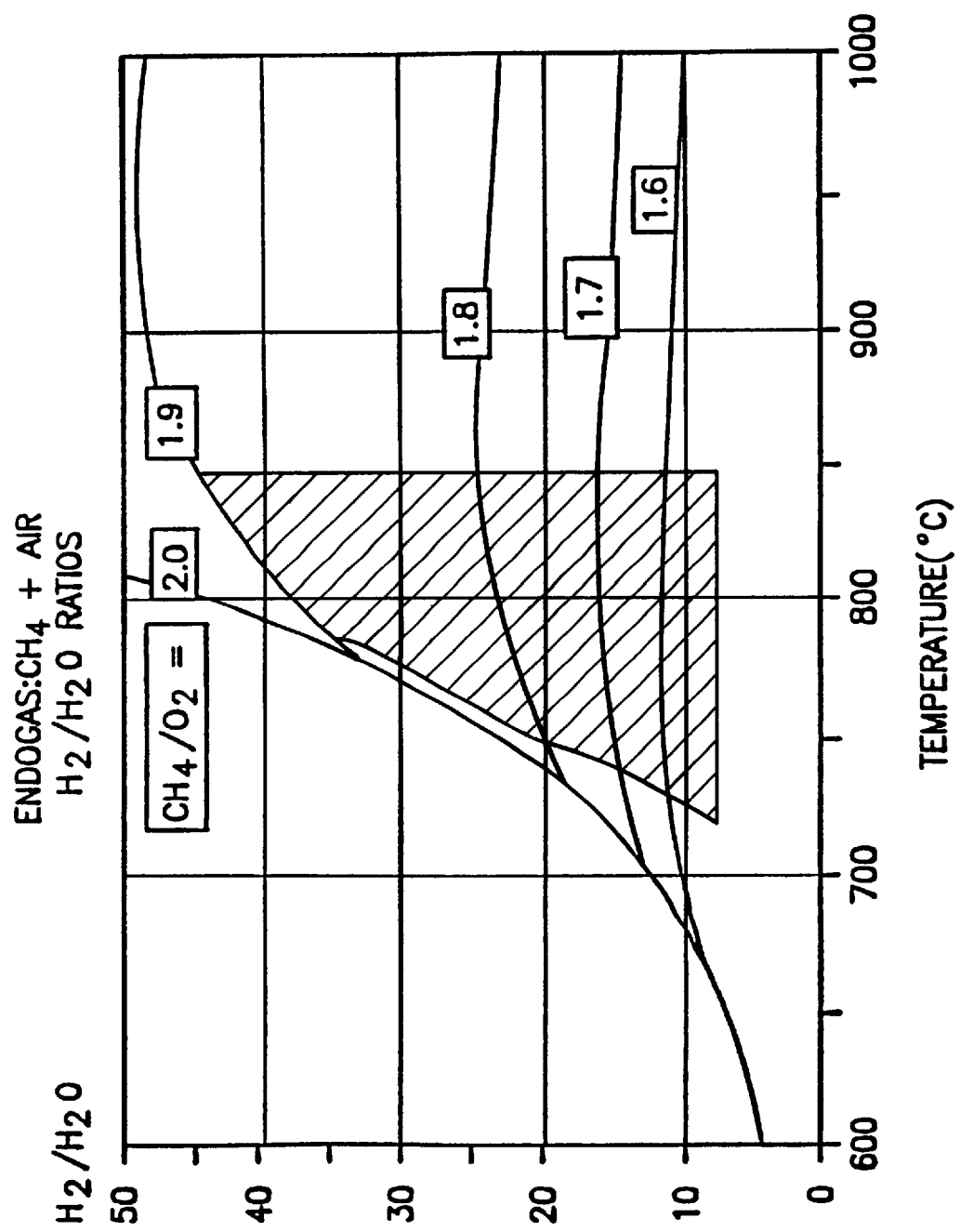

FIGS. 6 and 7 illustrate the operational domain for the endothermic reactor of the present invention. Its essential feature is that the $O_2$ content in the mix is sufficiently high (>5%) and enough $CO_2$, and $H_2O$ is allowed to form to bring the adiabatic reactor temperature to the operating temperature of noble metal catalysts. A modest amount of preheat can be added if higher ratios are desired.

FIGS. 8–12 illustrate embodiments of reactors according to other, more preferred embodiments of the invention.

Figure 8:
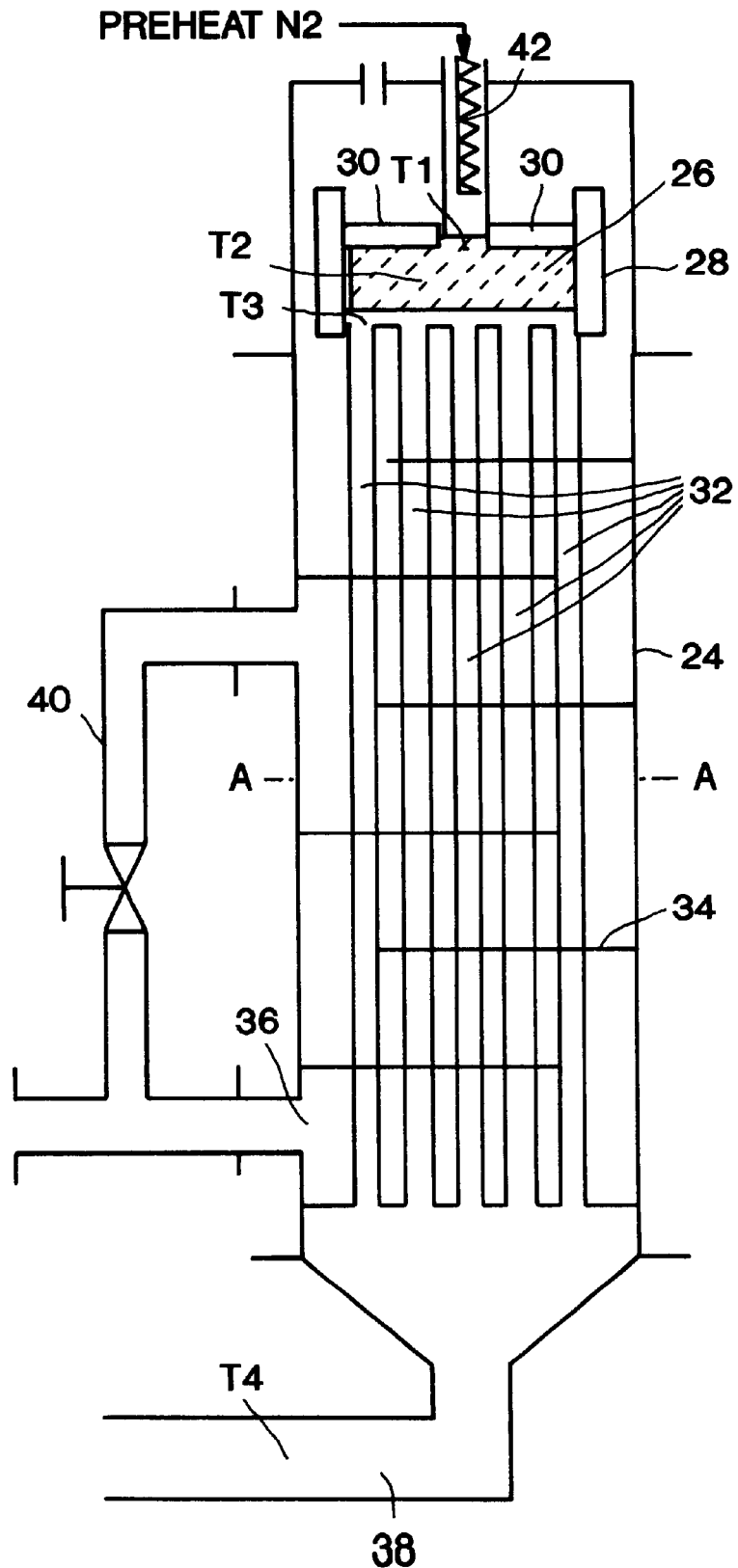
FIG. 8 is a cross-sectional illustration side-view of an alternative embodiment of a reactor contemplated by the invention; the reactor including a catalyst and carrier that operates autothermally according to the principles of the present invention.

In FIG. 8, a platinum catalyst on alumina carrier was placed in a container to form a catalyst bed 26. The outside of the catalyst bed is surrounded with insulation 28 and a porous ceramic disk 30 is placed on top to cut down heat loss from the top of the bed. In addition to minimizing heat losses from the top of the bed the porous ceramic disc 30 also functions to stabilize the bed. The weight of the monolith pushes down on the catalyst (typically in the form of spheres) and prevents them from moving relative to one another when the reactants flow through the bed. We have found that without this type of weighting on the catalyst bed, the catalyst experiences attrition.

Tubes 32 are connected to the bottom of the cylindrical container to direct the flow of the hot product endogas as it leaves the catalyst bed. The tubes have alternating, segmented baffles 34 installed along their length to allow for the flow of feed gas around them.

Figure 9:
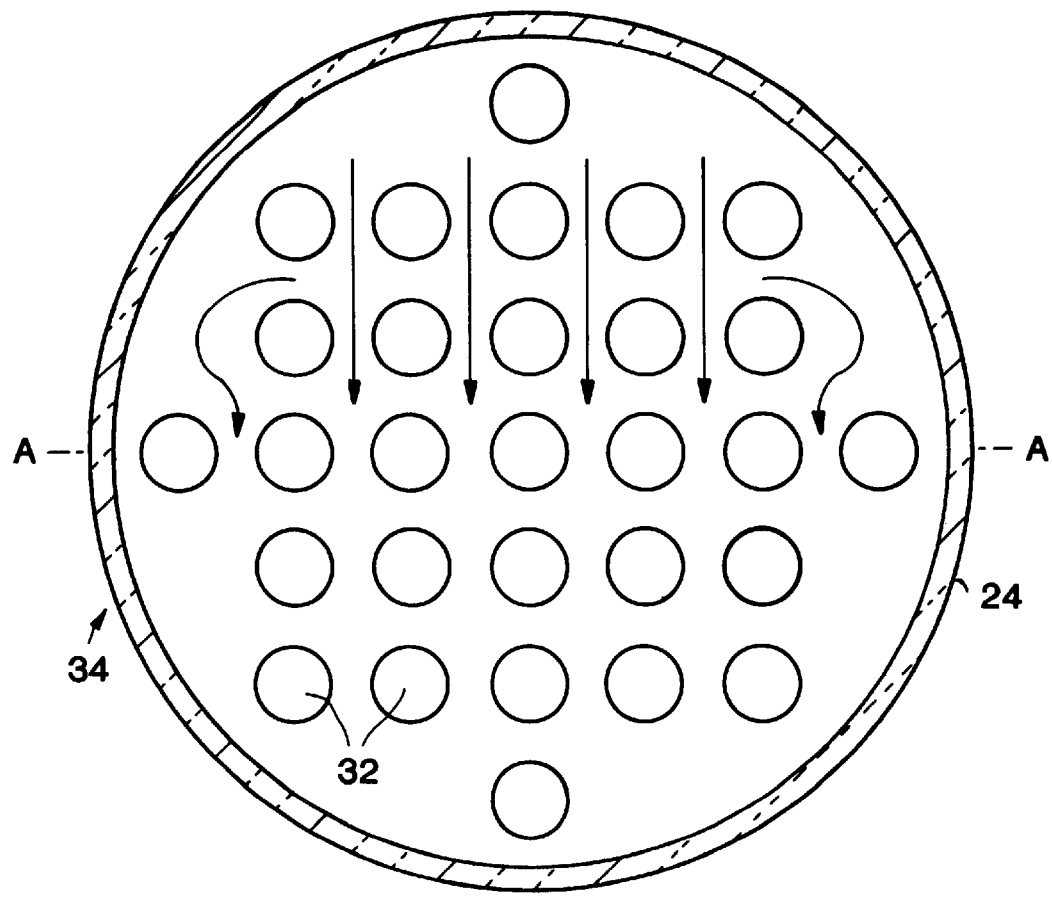
FIG. 9 is a cross-sectional view of a reactor of the invention across the line A—A.

The tubes and catalyst bed are surrounded by a cylindrical container 24 with a opening 36 for introducing the air/fuel mix. The bottom ends of the tubes are sealed to a circular tube sheet. The outside diameter of the tube sheet is sealed to the inside diameter of the cylindrical container. This forms a passage that directs the air/fuel mix around the outside of the gas tubes 32 in a counter-current/cross flow pattern (as illustrated in FIG. 9). In this manner, the hot reaction product gas passing through tubes 32 is cooled via heat exchange by the passage of the air/fuel mix around the outside of the tubes 32 as directed by the baffles 34, and as shown by the arrows.

FIG. 9 shows a view of the reactor across line A—A. Product gas flows through tubes 32. The arrows indicate the direction of the heat-exchange flow of the feed gas around the tubes 32. This Figure is applicable to the reactor illustrated in FIGS. 8 and 10–12.

The heat exchanger in the FIG. 8 has the cooler reactants flowing on the shell side of the shell and tube heat exchanger. In an alternative, but less preferred embodiment, the endogas flows on the shell side, as in FIG. 3. While either approach is functional, the design of FIG. 8 permits one to use less costly materials on the shell side of the heat exchanger. It also locates the catalyst bed at the top of the reactor where it can be easily reached during catalyst change outs. The reactor design of FIG. 3, in which the endogas flows on the shell side, requires that the catalyst bed be removed along with the tube bundle. Finally, the greatest potential for fouling in the heat exchanger comes from the endogas which could potentially soot in the heat exchanger. Having the endogas directed through the tube side means that any sooting would occur on the inner diameter of the tubes. The inside of the tubes could be easily cleaned using conventional techniques.

In FIG. 8 a bypass line 40 on the heat exchanger is shown. This line permits one to divert a portion of the air/fuel mix away from the heat exchanger up to the top of the reactor where it is subsequently mixed with the bulk flow of gas passing through the heat exchanger. The net effect of opening this valve is to reduce the preheat on the incoming reactants. This can be especially important when the hydrocarbon used for the reaction is more reactive than methane (e.g. propane). Propane can react before the catalyst bed when the preheat rises above 250° C. A bypass valve of this type could be used to limit the preheat. This reduces the need for reactors to be custom built for each different fuel source.

The entire reactor may be covered with a layer of insulation to minimize heat losses. Product endogas flows out of the reactor via outlet 38.

Due to the novel design of this reactor, only a portion of the catalyst 26 is required to be heated during a cold start. Localized heating of the catalyst 26 may accomplished with an element 42. This heating element may be any source of localized heat including, but not limited to, an electrical/resistance element or small burner. This energy source is available at all heat treatment facilities. The element 42 (referred to as 42', 42" and 42'" in FIGS. 10–12) may be used to heat a flow of nitrogen which in turn heats a small portion of the catalyst as in the example cited below. This approach helps to purge the bed of combustibles and poses a reduced safety risk. In an alternative embodiment (applicable to FIGS. 8 and 10–12), a sheathed heating element may be utilized to heat the catalyst by direct contact. This may also be used in conjunction with an external purge.

The fact that only a localized portion of the catalyst is required to be heated during start-up is surprising, and offers a significant commercial advantage over other systems. In particular, the amount of energy required to start the system is about 5 BTU's, preferably about 10 BTU's. In comparison, the energy required to heat the entire catalyst bed is about 1700 BTU's. This advantage also applies to the amount of time required to start the reactor. The embodiment illustrated in FIGS. 8–12 only requires about 15 minutes, versus about 120 minutes for a system wherein the entire catalyst bed is heated.

In an example using the reactor described in FIG. 8, a platinum catalyst on alumina carrier with 1.0% by weight loading was used in the form of ⅛" diameter spheres. Approximately 4.5 lbs of this catalyst was placed in a cylindrical container having an inner diameter of approximately 9.5 inches. Thirty tubes (30) having an outer diameter of 0.84 inches, wall thickness of 0.109 inches and a length of 4½ feet were used. An air/CH4 mix at a ratio of 2.4/1 was introduced into the reactor. Localized heating in the reactor is accomplished with an electrical element.

Approximately 150 scfh of nitrogen was directed through the electrical element and heated to bring the top, center portion of the catalyst bed to roughly 932° F. Starting with a uniform catalyst temperature of 45° F. the reaction was initiated 19 minutes after the heater was turned on.

A total of 2328 scfh natural gas and 5532 scfh air were mixed in a air/fuel mixing machine and passed through the heat exchanger and over the catalyst bed using a space velocity of about 83,200 per hour. About 11,650 scfh of reacted gas was produced from this reactor. Table 1 shows the operating temperatures and the composition of the product endogas. The references to T1–T4 are found in FIG. 8.

bed in the form of weights 54 to keep the bed tightly packed and combat catalyst attrition. All other features of the bed are substantially the same.

Figure 10:
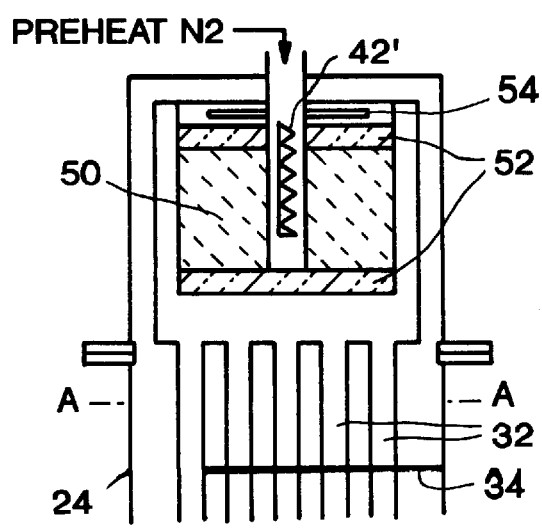
FIG. 10 is a cross-sectional side-view illustration of an alternative embodiment of a radial flow reactor contemplated by the invention; the reactor including a catalyst and carrier that operates autothermally according to the principles of the present invention.
Figure 11:
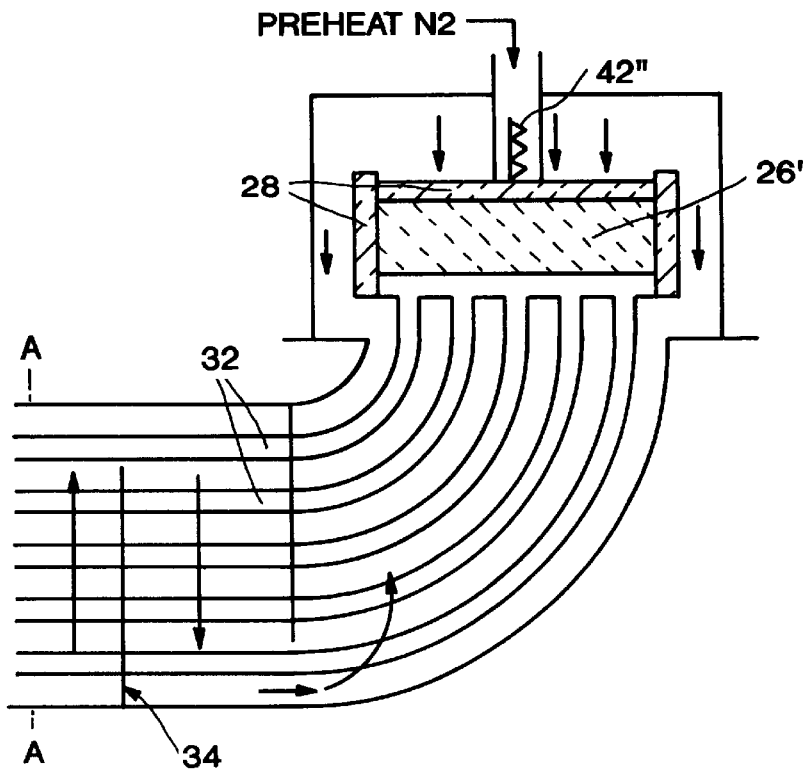
FIGS. 11 and 12 are cross-section side-view of the upper portion of other embodiments of a reactor according to the invention.
Figure 12:
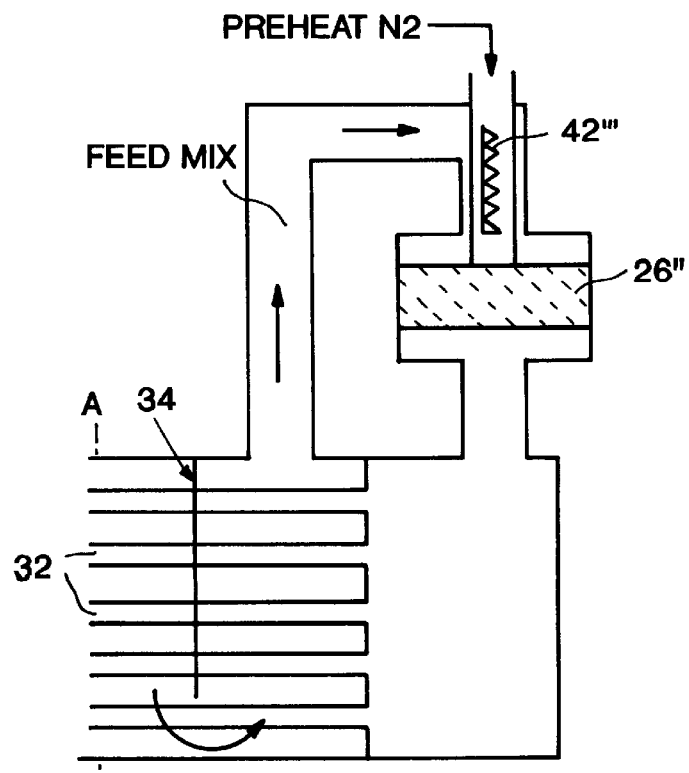

FIGS. 11 and 12 illustrate alternative embodiments of the reactor of FIG. 8. In these embodiments the heat exchanger portion of the reactor is horizontal, whereas the flow of the feed across the catalyst is vertical. The arrows indicate the direction of flow of the feed gas to the catalyst bed 26' (FIG. 11) and 26" (FIG. 12). These Figures illustrate the portion of the reactor that differs from that in FIG. 8. The non-illustrated portion of the reactor is substantially the same as in FIG. 8 (except that it is horizontally aligned). By keeping the catalyst bed 26' (26") vertical, it remains structurally stable and is easier to remove, if such removal becomes necessary. Of, course it is contemplated that the flow of the reactant gases across the catalyst may be in a radial direction as in FIG. 10 (with the catalyst bed having a similar design as illustrated in that Figure).

The high operating temperatures at the initial catalyst layers can cause premature failure of conventional catalyst because the catalyst support may sinter, thus reducing the

TABLE 1

| Preheat Temp (° C.) | Top Bed Temp T1 (° C.) | Middle Bed Temp T2 (° C.) | Exit Bed Temp T3 (° C.) | Exhaust Gas Temp T4 (° C.) | CO (%) | CO2 (%) | H2 (%) | H2O (%) | CH4 (%) |
|---|---|---|---|---|---|---|---|---|---|
| 548 | 642 | 796 | 756 | 378 | 19.5 | 0.62 | 37.5 | 0.86 | 2.5 |

For ex-situ applications as described in FIG. 8 the reactor is surrounded with a layer of insulation to minimize heat loss. For in-situ applications the high temperature furnace will minimize the heat losses so no insulation would be used. For in-situ applications the furnace heat can be used in lieu of the separate heating element to initiate the reaction. The heating element can be used to heat a gas stream which in turn would heat the catalyst as described in the above embodiment or it may be a sheathed element without gas flow. The hot surface of the element would heat the adjacent catalyst by direct contact. The reactor can be vertically orientated as depicted in FIG. 8 or arranged horizontally as in FIGS. 11 and 12, discussed below.

The product gas can soot in the exit piping that connects the outlet 38 of the reactor with a metal treatment furnace if it is not quickly brought below 600° F. Sooting is not a problem when the reactor is located close to or in the furnace. An air or water cooled heat exchanger can be used where the gas must be piped for long distances or there is a desire to measure the exit gas flow with conventional rotometers.

In accordance with the invention, this quenching equipment is smaller than that for a typical endogenerator because of the lower exit gas temperatures. Many applications require that the gas be further diluted with nitrogen. Mixing the endogas with a volume of 25% or more nitrogen will stop the sooting reaction.

Catalyst bed design has centered around trying to conserve the heat resulting from the combustion reaction and using this heat to drive the steam reforming reaction. The aforementioned insulation 28 at the top and sides of the catalyst bed helps accomplish this goal.

FIG. 10 illustrates a radial bed design alternative to the reactor illustrated in FIG. 8, wherein the feed gas flows radially (e.g. through a feed inlet in the center of the bed) across the radius of the catalyst bed 50. Insulation 52 reduces heat loss, and pressure is applied to the top of the effective surface area of the catalyst. In order to minimize this problem combinations of catalyst supports that are stable at high temperatures may be combined with the catalyst.

An example of a catalyst that is stable at high temperature is a Pt deposited on an alumina monolith. The high temperature combustion reactions would take place on the monolith while the high surface area catalyst would be used for the water shift reaction and to establish the steam reforming equilibrium. One embodiment of this design would be to load the ceramic insulator on top of the bed with a noble metal. Another embodiment could be to surround the monolith with conventional catalyst. The oxidant/fuel is first directed across the monolith then is passed over the surrounding catalyst. The gas flow where the combustion reaction takes place is in counterflow with the gas flow where steam reforming occurs. This is done to take full advantage of the heat generated by the combustion reaction to drive the reforming reaction and minimize the peak temperatures on the catalyst.

The reactors of FIGS. 8–12 offer several advantages, even over the reactor of FIG. 3. In particular we have found that the distance between the catalyst and heat exchanger is critical to the FIG. 8–12 invention. In particular we have found that the reactants that have been preheated in the heat exchanger should spend less than 1 second, preferably less than 500 milliseconds and more preferably less than 75 milliseconds between the time they exit the exchanger and the time they contact the catalyst. This timing is important in that not only does it minimize heat loss during the passage from exchanger to catalyst, but it also must be short enough to prevent premature reaction of the reactants prior to contacting the catalyst.

The practical advantage of this is that the system of this embodiment allows one to change the flow of reactants by a factor of at least 6, and even 10 without affecting the efficiency of the system and the quality of the endogas produced. In comparison, the system of FIG. 3 allows for a maximum flow reduction of about 4.

Another advantage of the reactor of FIGS. 8–12 is that the output of this endothermic reactor can be advantageously mixed with inexpensive nitrogen from a non-cryogenic source to obtain atmospheres suitable for heat treating.

While the invention has been described in connection with a preferred embodiment, it is not intended to limit the scope of the invention to the particular form set forth, but, on the contrary, it is intended to cover such alternatives, modifications, and equivalence as may be included within the spirit and scope of the invention as defined in the appended claims.

What is claimed is:

1. A reactor apparatus for the endothermic generation of carbon monoxide and hydrogen atmospheres for the heat treating of ferrous metals, non-ferrous metals, alloys and metal and/or ceramic powders comprising:

a non auxiliary heat source;

a porous ceramic carrier means for a catalyst disposed proximate to said heat from said heat source;

a catalyst means containing a noble metal disposed on said carrier means;

a means for heating a portion of said catalyst means;

a source of input gases including hydrocarbon gas and an oxidant gas mixture containing between 5% to 100% oxygen, said input gas including said hydrocarbon gas and said oxygen being exposed to said non-auxiliary heat source;

means for directing said hydrocarbon gas and said oxygen onto said carrier and catalyst means wherein said hydrocarbon gas oxidizes to produce output gases including carbon monoxide and hydrogen wherein the space velocity of said output gases is at least 10,000 standard cubic feet per hour of output gas per cubic foot of catalyst used;

a heat exchanger, the exit of which is located adjacent to said catalyst means, wherein said non-auxiliary heat source is in said oxidized hydrocarbon output gases.

2. A reactor apparatus according to claim 1, wherein said porous ceramic carrier means is composed of alumina.

3. A reactor apparatus according to claim 1, wherein said porous ceramic carrier means is composed of a ceramic selected from the group including silica, zirconia, titania and magnesia.

4. A reactor apparatus according to claim 1 wherein said catalyst means is composed of rhodium.

5. A reactor apparatus according to claim 1 wherein said catalyst means is composed of platinum.

6. A reactor apparatus according to claim 1 wherein said means is composed of ruthenium.

7. A reactor apparatus according to claim 1 wherein said catalyst means is composed of a noble metal selected from the group including palladium, osmium and iridium.

8. A reactor apparatus according to claim 2 wherein said alumina carrier means is reticulated alumina foam having pores therein, wherein said catalyst means is rhodium combined with said alumina foam carrier means, wherein said hydrocarbon gas is methane, and wherein said oxidation of said methane produces carbon monoxide and hydrogen according to the equation $$CH_4 + \tfrac{1}{2}O_2 \rightarrow CO + 2H_2.$$

9. A reactor apparatus according to claim 2 wherein said alumina carrier means is a reticulated alumina foam having pores therein, wherein said catalyst means is platinum is combined with said alumina foam carrier means, wherein said hydrocarbon gas is methane, and wherein said oxidation of said methane produces carbon monoxide and hydrogen according to the equation $$CH_4 + \tfrac{1}{2}O_2 \rightarrow CO + 2H_2.$$

10. A reactor apparatus according to claim 1, wherein said heat exchanger includes a first conduit for directing said hydrocarbon gas and said oxygen onto said carrier and catalyst means and a second conduit within said first conduit for directing said output gases out of said reactor apparatus wherein a heat exchange occurs from said output gases to said input gases.

11. A reactor apparatus according to claim 1 wherein said reactor apparatus is mounted within a heated furnace wherein metals and metal or ceramic powders are heat treated by said furnace heat wherein said carbon monoxide and hydrogen of said reactor apparatus output gases provide a buffer atmosphere for oxygen, and wherein said furnace heat is further used as said non-auxiliary heat source.

12. The reactor apparatus of claim 1, wherein said carrier and catalyst means are contained in a cylindrical arrangement and wherein said apparatus comprises means for directing said input gases across said carrier and catalyst means in an axial direction.

13. The reactor apparatus of claim 1, wherein said carrier and catalyst means are contained in a cylindrical arrangement and wherein said apparatus comprises means for directing said input gases across said carrier and catalyst means in a radial direction.

14. The reactor apparatus of claim 1, further comprising a porous ceramic material disposed on top of said carrier and catalyst means.

* * * * *